(12) United States Patent
Minami et al.

(10) Patent No.: US 8,269,366 B2
(45) Date of Patent: Sep. 18, 2012

(54) HANDY TERMINAL FOR WIND TURBINE GENERATOR

(75) Inventors: Tohru Minami, Tokyo (JP); Eiji Irie, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 34 days.

(21) Appl. No.: 12/675,417

(22) PCT Filed: Feb. 18, 2010

(86) PCT No.: PCT/JP2010/052441
§ 371 (c)(1),
(2), (4) Date: May 18, 2010

(87) PCT Pub. No.: WO2011/101969
PCT Pub. Date: Aug. 25, 2011

(65) Prior Publication Data
US 2011/0204631 A1   Aug. 25, 2011

(51) Int. Cl.
*F03D 9/00* (2006.01)
(52) U.S. Cl. .......................................... 290/55; 290/44
(58) Field of Classification Search .................. 290/44, 290/55
See application file for complete search history.

(56) References Cited

U.S. PATENT DOCUMENTS

| 8,033,686 B2 * | 10/2011 | Recker et al. | 362/249.02 |
| 8,063,500 B2 * | 11/2011 | Minami et al. | 290/44 |
| 2002/0087234 A1 * | 7/2002 | Lof et al. | 700/286 |
| 2009/0259429 A1 | 10/2009 | Elisiussen | |
| 2010/0013227 A1 | 1/2010 | Weitkamp | |
| 2010/0138188 A1 | 6/2010 | Mengane et al. | |
| 2010/0290905 A1 | 11/2010 | Knudsen | |
| 2011/0035068 A1 | 2/2011 | Jensen | |
| 2011/0055584 A1 | 3/2011 | Meier et al. | |

FOREIGN PATENT DOCUMENTS

| CN | 201448194 | 5/2010 |
| JP | 2002-349413 A | 12/2002 |
| JP | 2003-242231 A | 8/2003 |
| JP | 2007303420 A | 11/2007 |
| JP | 2009137746 A | 6/2009 |
| JP | 2009-287453 A | 12/2009 |
| JP | 2009-544880 A | 12/2009 |
| WO | WO 01/77525 | 10/2001 |
| WO | 2008/009354 A2 | 1/2008 |
| WO | WO 2008/086801 | 7/2008 |

OTHER PUBLICATIONS

Office Action in English from corresponding Application No. AU 2010201616.
International Search Report of Application No. PCT/JP2010/052241 mailed May 18, 2010.
Office Action for CA2693752, dated Dec. 15, 2011.
Japanese Office Action for JP2010-507749, dated May 11, 2012.

* cited by examiner

*Primary Examiner* — Tho D Ta
(74) *Attorney, Agent, or Firm* — Kanesaka, Berner & Partners, LLP

(57) ABSTRACT

A handy terminal for a wind turbine generator which the maintenance of the wind turbine generator, especially the maintenance work inside the nacelle, can be simplified while considering the safety of the maintenance operator. The handy terminal comprises a tower provided to stand on land or off-shore, a nacelle supported on the tower to be controlled to rotate in the yaw direction and a plurality of rotatable blades attached to the nacelle to be controlled to move their pitch, whereby the handy terminal is connectable to connecting ends respectively provided on the lower portion of the tower and the nacelle so as to perform various control of the wind turbine generator.

9 Claims, 13 Drawing Sheets

HANDY TERMINAL FOR WIND TURBINE GENERATOR

RELATED APPLICATIONS

The present application is a National Phase of International Application Number PCT/JP2010/52441, filed Feb. 18, 2010, the disclosure of which is hereby incorporated by reference herein in its entirety.

BACKGROUND OF THE INVENTION

1. Field of the Invention

The present invention relates to a handy terminal for a wind turbine generator that selectively switches an operation mode and a maintenance mode of the wind power generator to perform predetermined control operations corresponding to each mode. In particular, the invention relates to a handy terminal for a wind turbine generator having a tower provided to stand on land or off-shore, a nacelle supported on the tower to be controlled to rotate in the yaw direction and a plurality of rotatable blades attached to the nacelle to be controlled to move their pitch, whereby the handy terminal is connectable to connecting ends respectively provided on the lower portion of the tower and the nacelle so as to perform various control of the wind turbine generator.

2. Description of the Related Art

In recent years, from a view point of preserving the global environment, the use of wind turbine generators to generate reusable energy has become popular.

A large-sized wind turbine generator normally comprises a rotor head equipped with blades, a nacelle accommodating a drive train and a generator, and a tower supporting the nacelle. The drive train is for transmitting a torque from the rotor head side to the generator side, and usually includes a gear box so that rotational speed of the rotor head is increased to transmit to the generator. This so-called nacelle type wind turbine generator is popularly used as in wind farms where a plurality of nacelle type wind turbine generators are arranged in predetermined locations in order to secure effective use of wind power and stable power supply to commercial systems.

An example of a technology for maintenance management for a plurality of wind farms is disclosed in Japanese Unexamined Patent Application Publication No. 2009-287453. This technology teaches obtaining information related to running conditions of wind turbine generator systems within each wind farm, via a network that can communicate with each wind turbine generator, but does not teach of separately controlling each wind turbine generator in the wind farm.

Further, Japanese Unexamined Patent Application Publication No. 2002-349413 discloses a technology that enables stable supply of power output that is required by the power generating system as a whole. This technology discloses, for example, a wind turbine generator system comprising a plurality of wind turbine generators wherein each wind turbine generator is provided with a separate control device for controlling the operation thereof, and wherein the control device includes: a measuring means for measuring the operation condition of a local apparatus; a communication means for obtaining operating condition information of other wind turbine generators by exchanging operating condition information with other control devices provided in the other wind turbine generators; an operating pattern determining means for determining an operating pattern for the local apparatus so as to approach a target power output of the entire wind power system based on the operating information of the other wind turbine generators obtained by the communication means; and a control means for controlling the operation of the local apparatus based on the operating pattern determined by the operating determining means.

Prior Art: Japanese Unexamined Patent Application Publication No. 2009-287453.

Prior Art: Japanese Unexamined Patent Application Publication No. 2002-349413

SUMMARY OF THE INVENTION

However, the above technology is technology to enable stable supply of power output of the wind power system as a whole by obtaining operating condition information of other wind turbine generators, but does not separate the function of each wind turbine generator depending on the location conditions of the wind farm.

Specifically, in a site where a plurality of wind turbine generators are installed in the wind farm, each wind turbine generator has different control settings and is equipped with different equipments depending on the location conditions of the wind turbine generator. For example, among wind turbine generators constructed in a site on a hilly location, limiting conditions on output restriction are varied because wind speeds may vary due to elevation differences, or whether or not a lightning handling device etc. needs to be installed may differ from one wind turbine generator to another. Accordingly, different control logics to correspond to control conditions and equipments etc., are built into the control devices included in each wind turbine generator, and setting parameters unique to each wind turbine generator are inputted into the control logics.

In addition, maintenance of each of the wind turbine generators in the wind farms must be carried out separately and an operator must go inside the nacelle of the large wind turbine generator to perform the maintenance work. Thus, precise control mode settings are required. For example, with a nacelle type wind turbine generator, to lubricate a main shaft bearing of the main shaft that rotates by the rotation received by the blades, the shaft must be slowly rotated in order to evenly apply grease to the entire shaft bearing. Also, to assemble and disassemble the blades, the rotor head must be rotated so that the blades come into a horizontal position. In addition, for safety measures during maintenance work, the main shaft should be secured with lock pins to prevent it from rotating. Again in this case, the main shaft needs to be rotated to a position where the lock pins can be inserted.

Further, a control oil circuit that controls the yaw control or the blade pitch control of the plurality of blades in the nacelle contains a control oil pump motor. Still further, a lubricating oil pump motor is provided in the lubricating oil circuit of the gear box arranged between the main shaft that rotates by the rotation received by the blades and the generator, a cooler fan motor for cooling the lubricating oil and a off-line filter pump motor provided in the lubricating oil impurity filtering line are also contained in the nacelle. The operator must control the start-stop of these equipments while working inside the nacelle, making the maintenance work extremely cumbersome and complicated as well causing danger risks to the operator.

To solve the above objects, the present invention provides a handy terminal for a wind turbine generator which the maintenance of the wind turbine generator, especially the maintenance work inside the nacelle, can be simplified while considering the safety of the maintenance operator. In particular, the invention provides a handy terminal for a wind turbine generator having a tower provided to stand on land or off-shore, a nacelle supported on the tower to be controlled to rotate in the yaw direction and a plurality of rotatable blades attached to the nacelle to be controlled to move their pitch, whereby the handy terminal is connectable to connecting ends respectively provided on the lower portion of the tower and the nacelle so as to perform various control of the wind turbine generator.

To solve the above problems, the present invention provides a handy terminal for a wind turbine generator comprising a tower provided to stand on land or off-shore, a nacelle supported on the tower to be controlled to rotate in the yaw direction and a plurality of rotatable blades attached to the nacelle to be controlled to move their pitch, whereby the handy terminal is connectable to connecting ends respectively provided on the lower portion of the tower and the nacelle so as to perform various control of the wind turbine generator, the handy terminal further comprising:

an operation button for generating operation signals for various control devices that are incorporated into a control circuit in the wind turbine generator;

a display portion for displaying the operating state of the operation button; and a control portion for performing display control of the operation button, wherein the control portion of the operation button makes a mode selecting button to appear that selectively enables a maintenance mode or an operating mode of the wind turbine generator, and makes an operation button to appear that separately controls at least one of: a blade pitch control, a yaw brake control and an accessory motor provided on an oil circuit to control the blade pitch control and the yaw brake control that are incorporated in the wind turbine generator, correspondingly to a corresponding maintenance operation screen displayed on the display portion when the maintenance mode is selected from the selecting button.

The accessory motor in the present invention can be, for example, a control oil pump motor provided in the control oil circuit for yaw control or blade pitch control contained in the nacelle, a lubricating oil pump motor provided in the lubricating oil circuit of the gear box, a cooler fan motor for cooling the lubricating oil and a off-line filter pump motor provided in the lubricating oil impurity filtering line, but is not limited to above and can be any accessory motor accommodated in the nacelle.

A handy terminal for a wind turbine generator according to claim 1 wherein the display portion is a touch panel, and wherein the control portion for performing display control of the operation button makes a desired operation button to appear on the touch panel, and is configured so as to make an operating button that can separately control the blade pitch control, the yaw brake control and the accessory motor that are incorporated into the wind turbine generator to selectively appear correspondingly to the corresponding maintenance operation.

By making the operation button to selectively appear correspondingly to the corresponding maintenance operation, it is possible to further reduce the size of the display portion while being able to make the operation button itself sufficiently large enough to touch with the fingers.

It is preferable that the control portion for performing display control of the operation button makes an operating button that can separately control the blade pitch control, the yaw brake control and the accessory motor control to appear or enable that operating button, when the connecting portion is connected to the connecting end provided on the nacelle side.

By allowing button operation on only the nacelle side helps to secure safety of the operator when grease up is performed on the nacelle side.

It is preferable that the control portion for performing display control of the operation button makes an "auto" operation button that performs the "blade pitch control" according to wind speed in the maintenance mode state and an "increase/decrease manual operation button" that manually performs increase or decrease of the blade pitch angle to appear, when the operation button is the blade pitch control operation button.

By this, when greasing the main shaft bearing, by pressing the "auto" operation button on the handy terminal once at the beginning, it is possible to grease the main shaft bearing while the pitch automatically opens and closes, thus making the task easy to perform.

This improves work efficiency of greasing the blade circling ring shaft bearing compared to opening and closing the pitch by pressing the "pitch operation increase/decrease button" each time.

During greasing, if the "auto" operation button is pressed, it is preferable that the automatic pitch opening and closing is controlled to come to a stop.

It is preferable that the control portion of the operation button does not allow other operation buttons to be operated when the operation button of the "blade pitch control" is turned ON.

After stopping the automatic pitch open and close operation and the pitch is still closing, it is preferable that the next performance instructions are not accepted until the pitch is completely closed. Or, if pitch operation is being performed in step-auto by the "increase/decrease manual operation button" that no operation is received even if the automatic pitch open and close button is pressed. This secures the safety of the maintenance inspectors.

Further, it is preferable that the control portion for performing display control of the operation button makes a yaw break release/excite button to appear on a screen that has transited to yaw control from the startup screen of the maintenance mode, under the condition that the connecting portion has been connected to the connecting end provided on the nacelle side.

That is, by arranging a button for operating a YAW brake solenoid valve in the maintenance mode on the maintenance screen of the handy terminal, the operator can directly operate the YAW brake solenoid valve when performing YAW brake booster adjustments which improves convenience.

Preferably, the control portion for performing display control of the operation button makes accessory motor individual drive control buttons to appear for performing separate manual operations on each individual accessory on driving and stopping each motor corresponding to the accessories in the maintenance mode, when the operation button is the accessory control button.

By this, it is possible to manually operate the accessory motor, so when various experiments are being carried out during the maintenance mode, the devices can be manually operated to, for example, check the rotation direction etc. Thus the operation can flexibly carry out the various experiments and work efficiency is improved.

Further, by making it possible to start-stop each accessory motors from the nacelle side from the maintenance screen of the handy terminal, especially by making it possible to operate only in the nacelle, the motor rotation direction can be visually confirmed in a timely manner by operating it only from the nacelle.

Further, it is preferable that the control portion for performing display control of the operation button prohibits operation of an operation button that individually controls a blade pitch control and an accessory control even when that operation button is pressed, if the motor of the blade pitch control or the motor of the accessory control of the pressed operation is in an overload state.

Especially when there is an overload to the motor, it is not possible to visually confirm this, and thus it is preferable to prohibit operation.

Preferably the control portion for performing display control of the operation button makes an alert display to appear to alert that erroneous operation after transition to the maintenance mode could potentially be dangerous, and an agreement button to appear to waive the handy terminal's manufacturer of any responsibility caused by erroneous operations, when the maintenance mode has been selected from the mode selection button, and transfers to the maintenance screen after the agreement button has been pressed.

It is preferable to make the maintenance operator aware of the danger involved in operating the YAW and the pitch, and at the same time to always make the operator refer to the maintenance manual procedures before transferring to the maintenance screen so that the manufacturer is not held liable for erroneous operations.

It is especially preferable to make the operator select an Agree/Disagree button to the context of the alert display. Preferably, the screens transits to Agree→Maintenance screen, Disagree→Startup screen, respectively, and the button selection result is transmitted as track record to a remote control center.

In addition, it is preferable that the alert display is made to appear before operating either a pitch opening operation, a yaw circling operation or a main shaft braking operation in the maintenance mode.

According to the present invention, a handy terminal for a wind turbine generator can be provided, which the maintenance of the wind turbine generator, especially the maintenance work inside the nacelle, can be simplified while considering the safety of the maintenance operator.

DETAILED DESCRIPTION OF THE PREFERRED EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present.

Figure 1:
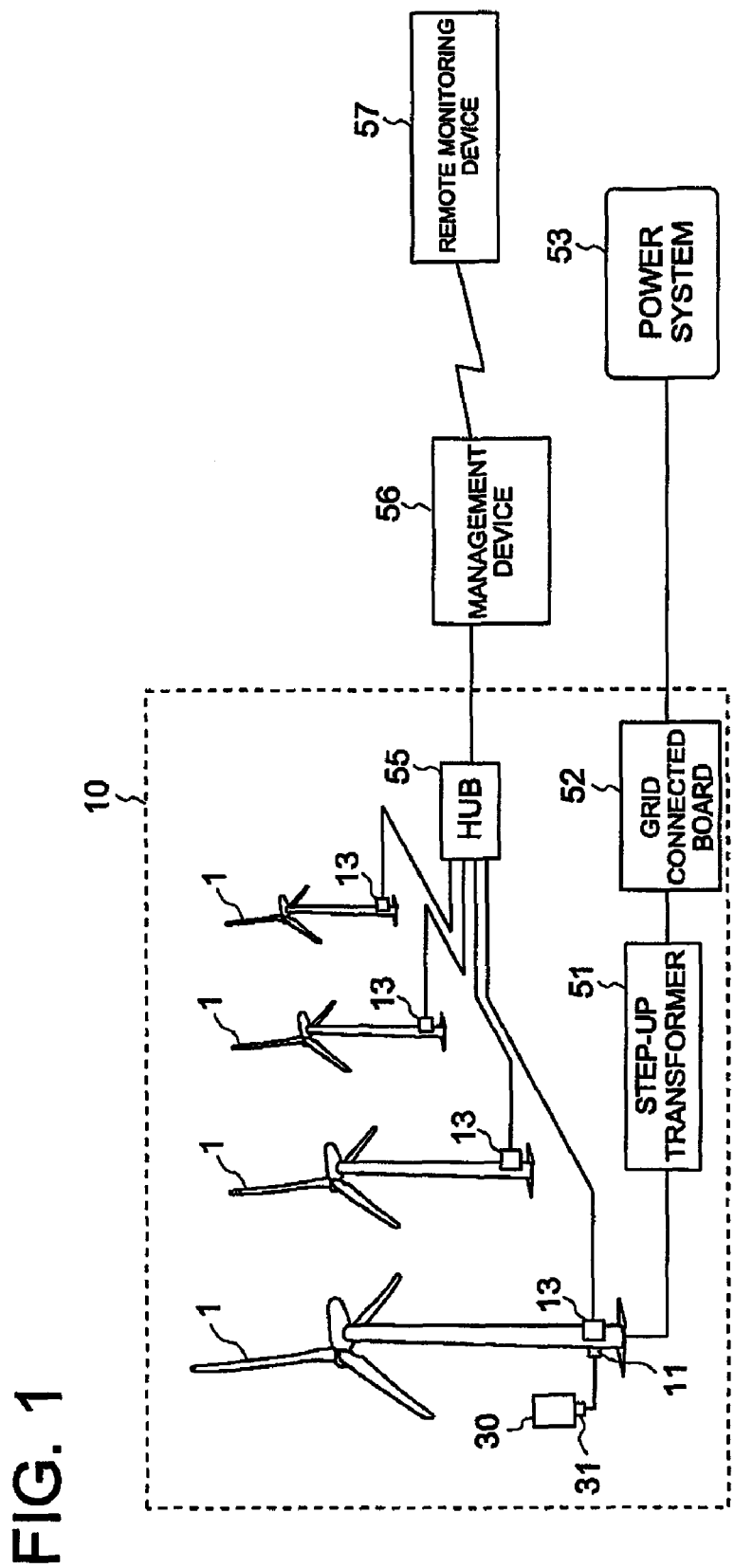
FIG. 1 is a schematic view showing an example of the overall structure of a wind power site according to an embodiment of the present invention.

First, with reference to FIG. 1, a description will be given of an example of the overall structure of a wind power site 10 having a plurality of wind turbine generators.

The wind power site 10 is comprised of a plurality of wind turbine generators 1, whereby these wind turbine generators 1 generate electricity utilizing wind power as energy. Electricity generated by the wind turbine generators 1 is transmitted to a power system 53 via a step-up transformer 51 and a grid connected board 52.

The plurality of wind turbine generators 1 are each equipped with at least one control circuit 13. The control circuit 13 includes a plurality of control logics that are common with the other wind turbine generators in the same site and controls the maintenance or operation of the wind turbine generator 1. The control circuit 13 is also coupled to a connecting end 11 through which various operation signals from a handy terminal 30 are inputted to the control circuit 13.

Further, the wind power site 10 may include a communication management system as described below.

A communication management system that remotely controls and monitors a plurality of the wind turbine generators 1, includes a management device 56 provided on the site, and a remote monitoring device 57 connected to the management device 56 via a communication line. The management device 56 is connected to a hub 55 via a communication cable while a plurality of control lines extended from the control circuits 13 are connected to the hub 55. Each of the management device 56 and the remote monitoring device 57 comprises a computer including CPU, ROM, RAM, memory and a communication interface, etc., and mainly monitors the operating condition of the wind turbine generators 1.

Figure 2:
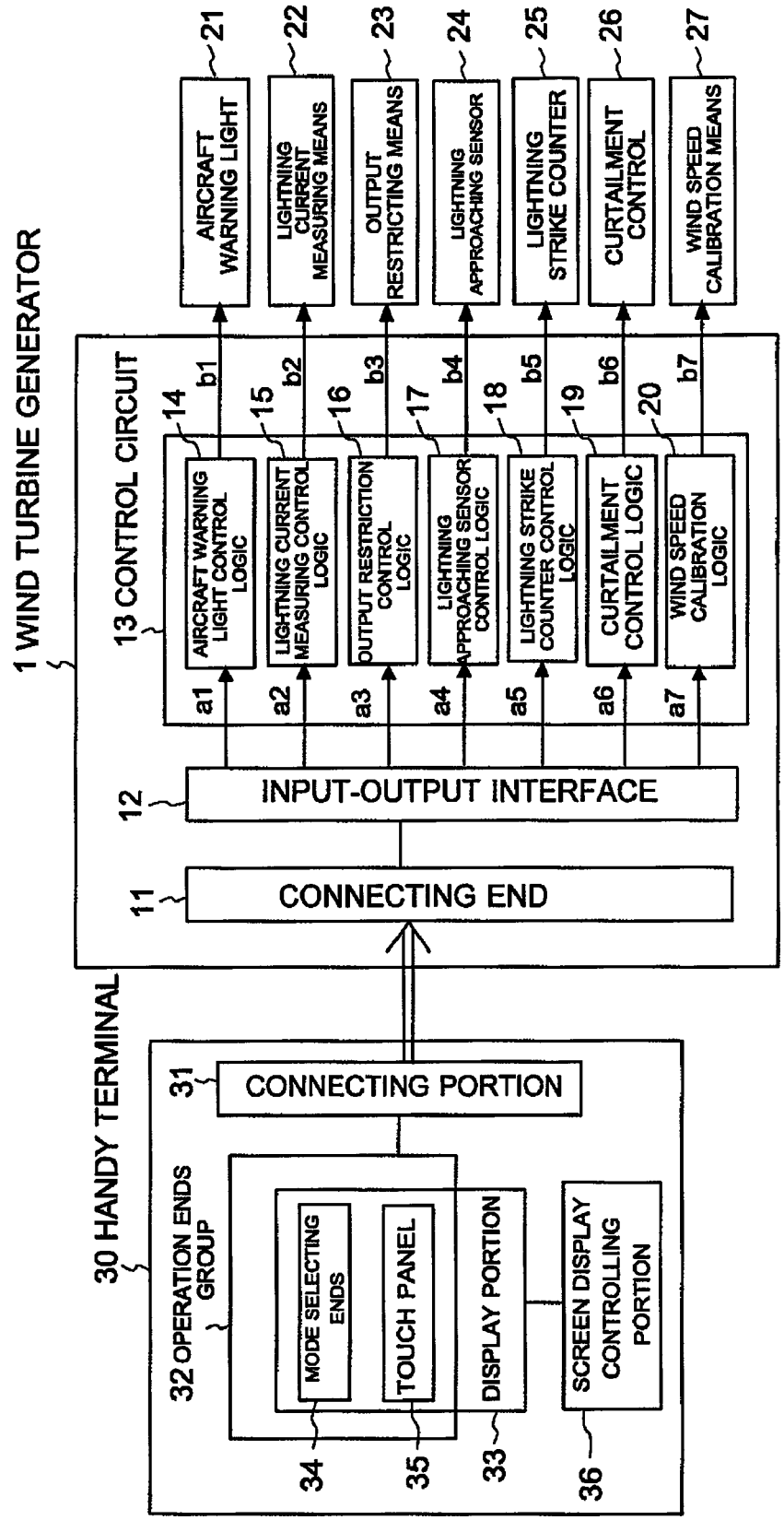
FIG. 2 is a block diagram showing structures of a wind turbine generator and a handy terminal according to the present embodiment.

FIG. 2 is a block diagram showing overall structures of a wind turbine generator and a handy terminal according to the present embodiment.

The wind turbine generator 1 mainly includes the connecting end 11, an input-output interface 12, and the control circuit 13 having a plurality of control logics 14-20.

The handy terminal 30 mainly includes a connecting portion 31, an operation ends group 32 and a display portion 33.

The connecting ends 11 of the wind turbine generator 1 and the connecting portion 31 of the handy terminal 30 have a standardized specification among the plurality of the wind turbine generator 1 so that the handy terminal 30 is connectable to any of the wind turbine generators 1.

The connecting portion 31 of the handy terminal 30 may be connected directly to the connecting end 11 of the wind turbine generator 1, or may be connected via a transmission cable. Since data is transmitted from the handy terminal 30 to the wind turbine generator 1 by this connecting method, data can be transferred in large capacities, making it possible to transmit operation signals for a plurality of control logics in a short amount of time.

The structure of the wind turbine generator 1 will now be described.

The control circuit 13 receives operation signals input from the handy terminal 30 via the connecting end 11 or signals detected by various sensors, performs various processes to generate control signals, and transmits these control signals to various devices.

The control circuit 13 is composed of a hardware including CPU, ROM, RAM and memory, etc (not shown). Preferably, the functions of the control logics 14-20 are realized by the hardware. Here, the given example shows how each control logic function 14-20 is realized by using a software, however, needless to say that it may be realized by using hardware logic (logic circuit).

The input-output interface 12 receives signals from the handy terminal 30, various sensors, and various devices, etc., and transfers the signals to each control circuit 13, and transmits the control signals generated by the control circuit 13 to various devices. It should be noted that the input-output interface 12 can be defined to include the connecting end 11.

In the control logics 14-20, operating conditions are set by operation signals a1-a7 that are inputted from the handy terminal 30, then the control logics 14-20 perform various processes under these conditions to generate control signals b1-b7 to transmit to various devices.

The operation signals a1-a7 include a selection signal for selectively enabling the control logics or a numeric signal for setting a condition of the control logic. These operating signals a1-a7 are inputted to the control circuit 13 to set the enabling/disabling of the control logics or numeric conditions are inputted to the control logic, and thereby the control signals b1-b7 are generated by the control logics under the operating conditions.

Specific examples of the control logics are; an aircraft warning light control logic 14 for controlling an operation of an aircraft warning light 21, a lightning current measuring control logic 15 for controlling an operation of a lightning current measuring means 22, an output restriction control logic 16 for controlling an operation of an output restricting means 23, a lightning approaching sensor control logic 17 for controlling an operation of a lightning approaching sensor 24, lightning strike counter control logic 18 for controlling an operation of a lightning strike counter 25, a curtailment control logic 19 for controlling an operation of a curtailment control means 26, a wind speed calibration logic 20 for controlling an operation of a wind speed calibrating means 27, etc.

The control circuit 13 has a plurality of control logics as described above, but within the wind power site 10 having the plurality of wind turbine generators 1, the combination of the control logics included in one wind turbine generator 1 is common among the other wind turbine generators in the same site.

As such, since the control circuit 13 includes common control logics applicable to the other wind turbine generator 1 in the same site, it is possible to standardize the construction of the control circuit 13, and therefore cost reduction can be achieved.

The structure of the handy terminal 30 will now be described.

The handy terminal 30 selectively switches an operating mode and a maintenance mode so as to perform a predetermined control corresponding to each switched mode.

The display portion 33 displays the operating state of the operating ends, and a liquid crystal display can be used as the display portion.

The operating ends group 32 generates an operation signal for selectively enabling the control logics in the control circuit 13 incorporated in the wind turbine generator 1. The operation signals generated by the operating ends group 32 are operation signals that selectively enable the operating or maintenance control logics of the control circuit 13 of the corresponding wind turbine generator 1 connected via the connecting portion 31, that are common to the other wind turbine generators in the same site. The operating ends group 32 may be a key board provided separately from the display portion 32, however, it is preferable that the operating ends group 32 is a touch panel 35 operable by touching on the screen surface of the display portion 33. Here, the touch panel 35 can employ a common operating method (for example, a resistive layer method).

As such, the wind turbine generator 1 has common control logics with the other wind turbine generators in the same site, the operation signals for selectively enabling control logics are inputted from the handy terminal 30 to transmit to the control circuit 13, and operating settings of the control logics are set appropriately for each wind turbine generator 1. Therefore, management of the control logics for each of the control circuits can be facilitated.

Further, since the operation signals are transmitted by connecting the connecting portion 31 of the handy terminal 30 to the connecting end 11 of the wind turbine generator 1, when condition setting or setting changes of the control logics need to be carried out during construction or maintenance of the wind turbine generator 1, it can quickly be done by the operator on site.

Further, it is preferable that the operating ends group 32 includes a mode selecting end 34 for selecting either a maintenance mode for controlling maintenance or an operating mode for controlling operation of the wind turbine generator 1.

By this structure of selectively switching from the maintenance mode to the operating mode through the mode selecting end 34, it is possible to easily input operation signals corresponding to the work through the handy terminal 30, to thereby improve work efficiency.

Further, the handy terminal 30 is equipped with a screen display control portion 36 for displaying an operation signal input screen for a plurality of control logics on the display portion 33.

Figure 3:
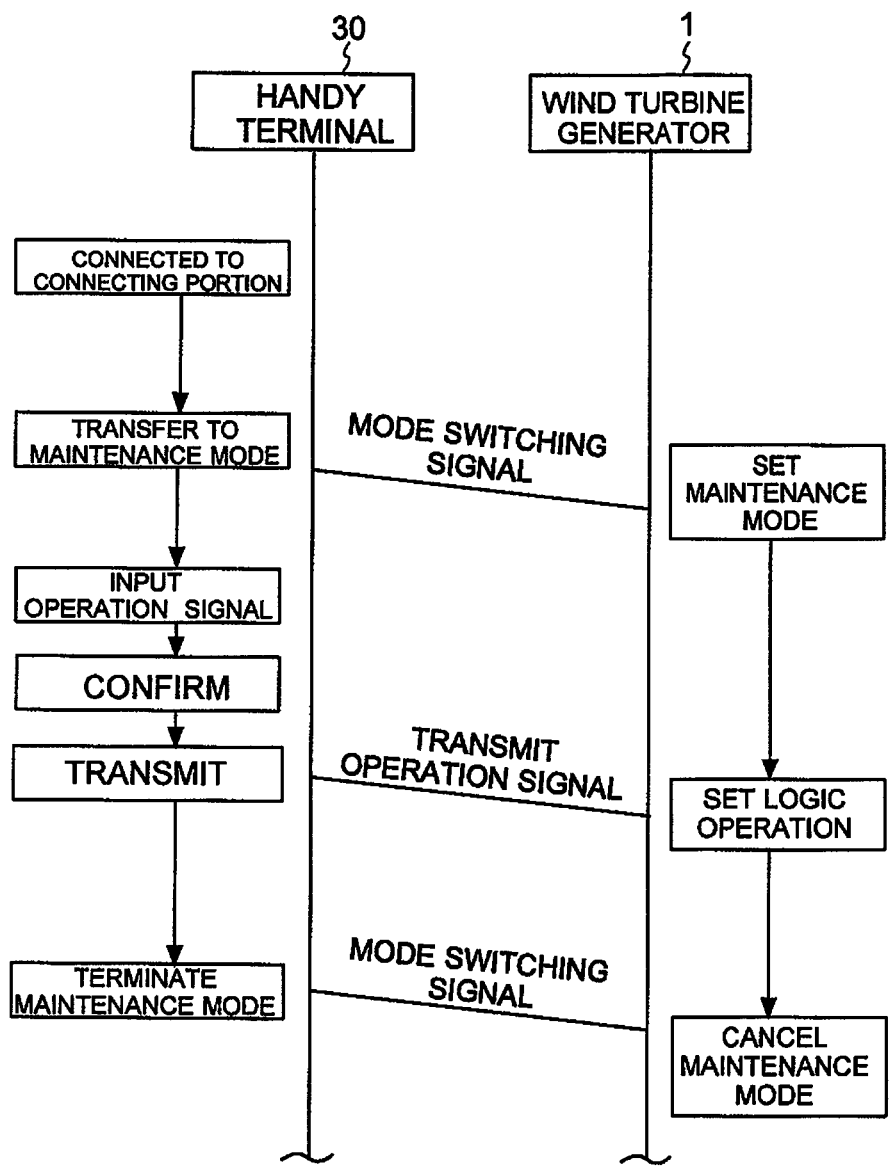
FIG. 3 is a sequence diagram showing processes of the wind turbine generator and the handy terminal.

Next, the procedure sequences of the wind turbine generator 1 and the handy terminal 30 will be explained with reference to FIG. 3.

The handy terminal 30 transfers to the maintenance mode when the maintenance mode is selected through the mode selecting ends 34. Upon receiving the maintenance mode switching signal, the wind turbine generator 1 is set to the maintenance mode. When the wind turbine generator 1 is set to the maintenance mode, it accepts the control logics of the condition settings and the setting changes.

When operation signals are inputted through the operation ends group 32, the handy terminal 30 performs a check of the control logics. When input of all the operation signals corresponding to the control logics that need to be set is completed, it is transmitted to the wind turbine generator 1.

The wind turbine generator 1 receives the operation signals from the handy terminal 30 and sets the operation conditions of the control logics in the control circuit 13 based on the operation signals of each control logic. Then, under the set operation conditions, control signals are generated by the control logics by which various means included in the wind turbine generator 1 are controlled.

When the handy terminal 30 is manipulated to terminate the maintenance mode, that mode switching signal is transmitted to the wind turbine generator 1, and the maintenance mode setting in the control circuit 13 is cancelled. After the maintenance mode setting has been cancelled, changing the settings of the control logic in the control circuit 13 becomes prohibited.

Figure 4:
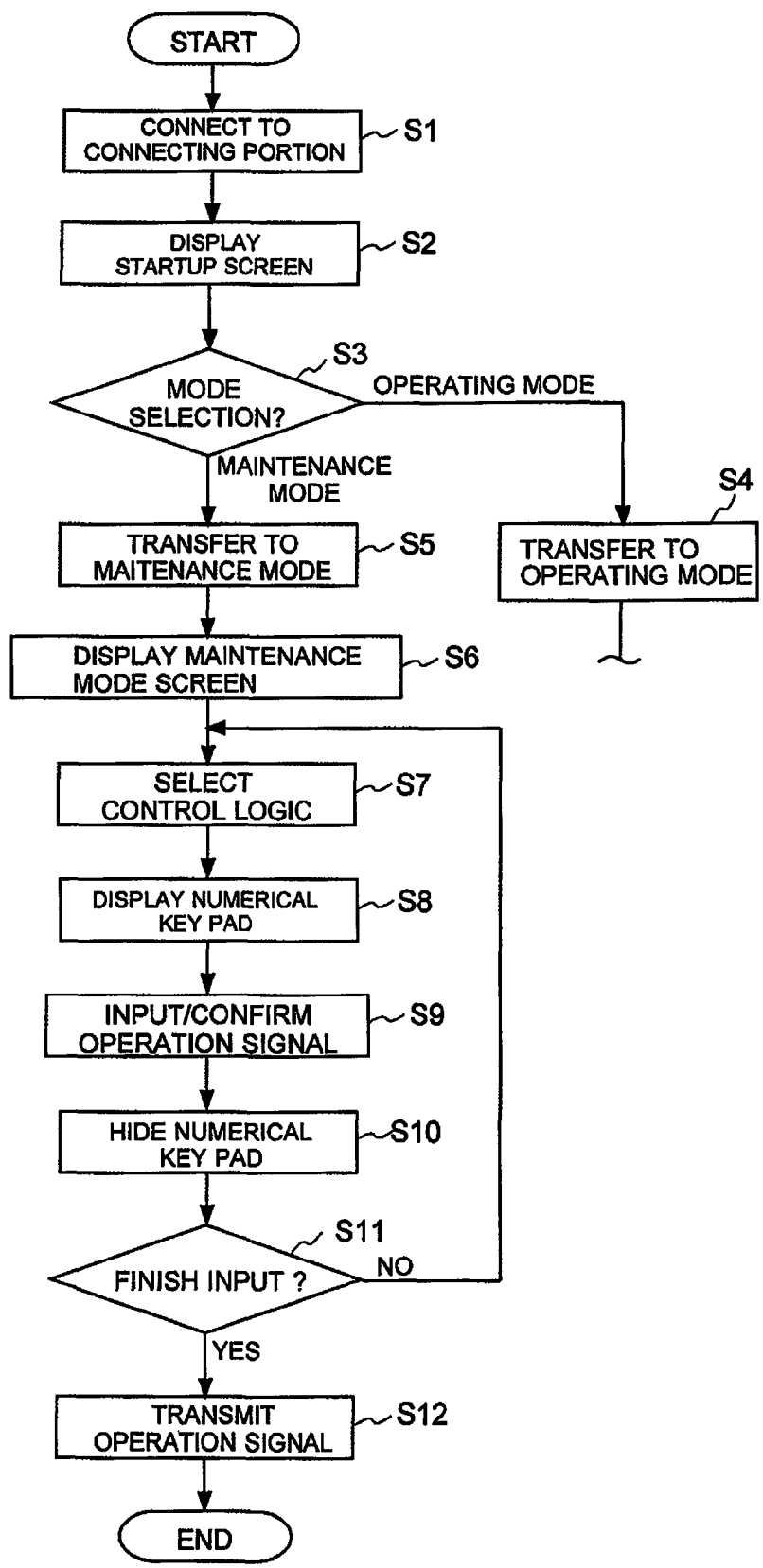
FIG. 4 is a flow chart showing the operation of the handy terminal.
Figure 5:
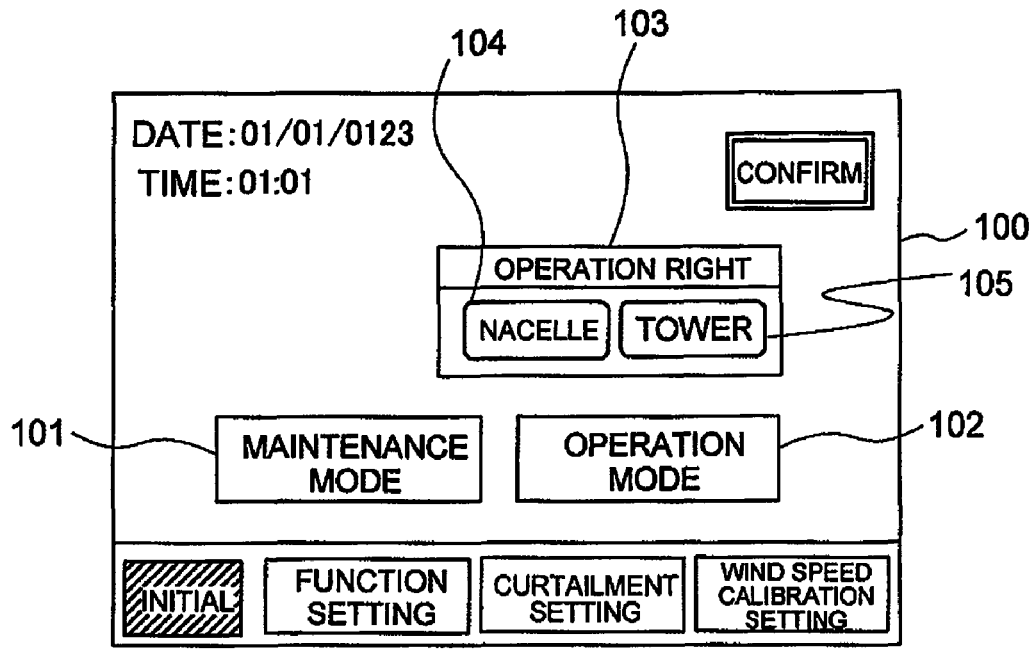
FIG. 5 is a view showing an example of a startup screen of the handy terminal.
Figure 6:
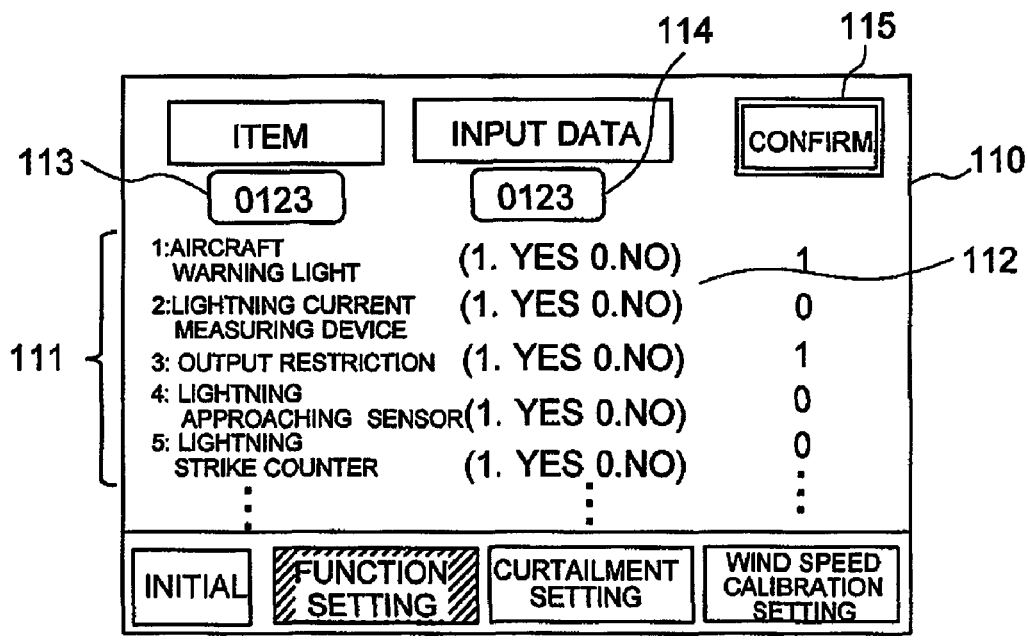
FIG. 6 is a view showing an example of a maintenance mode screen of the handy terminal.
Figure 7:
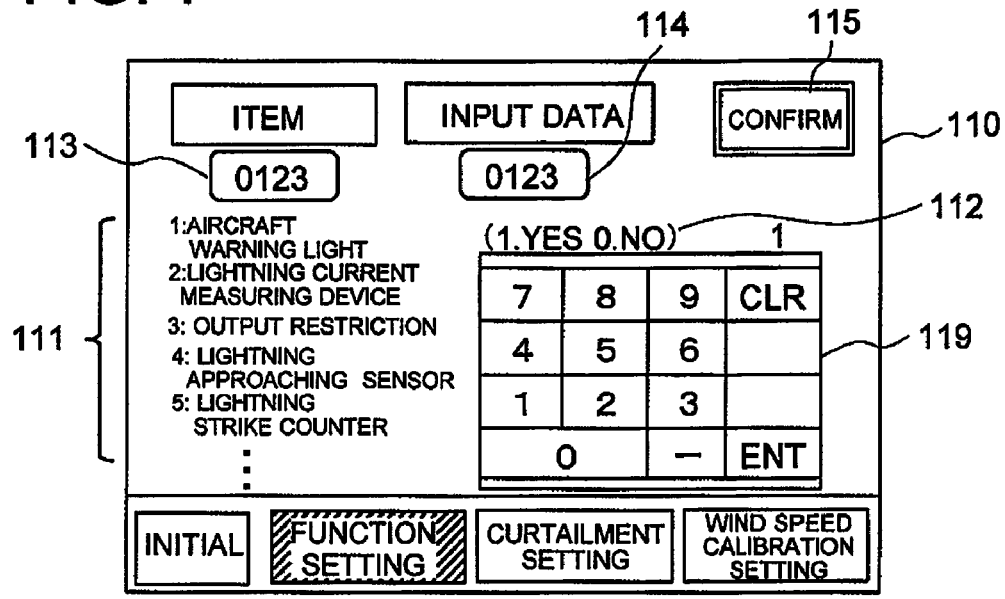
FIG. 7 is a view showing an example of the maintenance mode screen where a numerical keypad is displayed overlappingly.

Referring to FIGS. 4 to 7, a specific operation of the handy terminal 30 will be described. FIG. 4 is a flowchart showing an operation of the handy terminal. FIG. 5 is a diagram showing an example of a startup screen, and FIG. 6 is a view showing an example of a maintenance mode screen of the handy terminal. FIG. 7 is a view showing an example of the maintenance mode screen where a numerical keypad is displayed overlappingly.

First, the connecting portion 31 of the handy terminal 30 is connected to the connecting end 11 of the wind turbine generator 1 (S1), then, a startup screen is displayed after an electric source of the handy terminal 30 is turned on (S2). An example of the startup screen is shown in FIG. 5. The startup screen 100 displays a plurality of operation buttons including a maintenance mode button 101 and an operating mode button 102 of the mode selection ends 34. A mode selection is carried out by the mode selection ends 34 (S3). When the operating mode button 102 is pressed, the settings of the handy terminal 30 and the settings of the control circuit 13 transfers to the operating mode (S4). The contents of operating mode will be abbreviated.

On the other hand, if the maintenance mode button 101 is pressed, the settings of the handy terminal 30 and the settings of the control circuit 13 transfers to the maintenance mode (S5).

Further, if the control circuit 13 is provided on both the nacelle side and the tower side, the operating right of the control circuit 13 on the side that the handy terminal 30 is connected to can be selected by an operating right selecting button 103. The selection of the operating right can be done by pressing either a nacelle (side control circuit) button 104 or a tower (side control circuit) button 105. In a preferable configuration, operation signals from the control circuit of the selected side are received but operation signals of the control circuit from the non-selected side are not accepted.

In the maintenance mode, the screen display control portion 36 displays the maintenance mode screen on the display portion 33 (S6). An example of a maintenance mode screen (operation signal input screen) is shown in FIG. 6. The maintenance mode screen 110 displays control logic items 111 corresponding to a plurality of control logics included in the control circuit 13 and setting value options 112, in addition to an operation button 113 for switching to item selecting, an operation button 114 for switching to data inputting and an operation button 115 for transmitting the inputted operation signals to the control circuit 13.

When the operator presses the operation button 113 to switch item selections, as shown in FIG. 7, a numerical key pad 119 is displayed overlapping the maintenance mode screen 110, enabling selection of the control logic items 111 for inputting operation signals. The operator chooses a control logic item number by pressing the numerical key pad 119, then when ENTER is pressed, the numerical key pad screen disappears and the control logic item number that has been selected is displayed at the position of the operation button 113 (S7).

Next, when the operator presses the operation button 114 to switch to data inputting, as shown in FIG. 7, the numeric key pad 119 is displayed overlapping the maintenance mode screen 110 (S8), which allows setting values to be inputted. The operator inputs the setting value corresponding to the selected control logic through the numerical key pad 119 (S9). When ENTER is pressed, the numerical key pad screen disappears (S10), and the inputted setting value is displayed at the position of the operation button 114.

The setting values for all the required control logics are inputted in a similar manner.

When all the setting values have been inputted (S11), by pressing the operation button 115, the operation signals including the setting values of each control logic are transmitted to the wind turbine generator 1 (S12).

Here, the operation signals are selection signals that selectively enable the control logics, and inputting the operation signals switches the enabling/disabling of the control logics. By this structure, any unnecessary control logics in the plurality of control logics in the control circuit 13 can be disabled, and only the necessary control logics will be enabled. Also, it may be structured so that the operation signals are value inputs to set a value in the control logics.

Next, the structure of an example of the wind turbine generator 1 and the control objects that are controlled by the control logics will be described.

Figure 17:
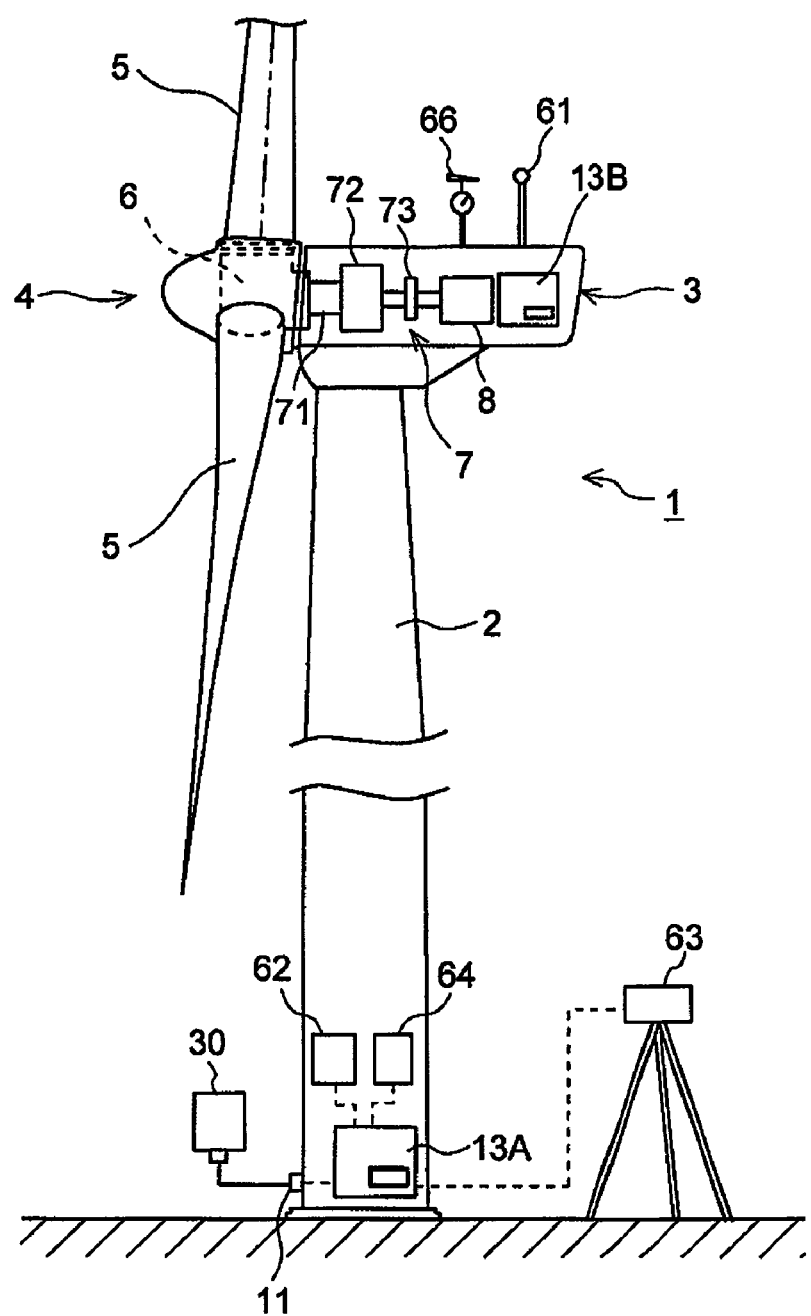
FIG. 17 is a view showing an example of the structure of a wind turbine generator.

FIG. 17 is a view showing an example of the structure of a wind turbine generator.

A wind turbine generator 1 mainly includes a tower 2 provided to stand on a foundation, a nacelle 3 provided on the upper end of the tower 2, a rotor head 4 provided on the nacelle 3, a plurality of blades 5 attached to the rotor head 4, and a pitch driving system 6 for driving the pitch of the blades 5.

The tower 2 has a column-like shape extending upwardly from the foundation. The tower 2, for example, can be made from a single column-like member or made from a plurality of units aligned in upright direction and coupled to each other. If the tower 2 is made from the plurality of units, the nacelle 3 is provided on the unit located on the top of the tower 2.

The nacelle 3 supports the rotor head 4 and accommodates a drive train 7 and a generator 8, etc.

The drive train 7 includes a main shaft 71 that is connected to a rotor head 4, a gear box 72 connected to the main shaft 71 and a coupling 73 that couples the gear box 71 to the generator 8.

The main shaft 71 is coupled to the rotor head 4 so that it rotates with the blades 5 and the rotor head 4, and is secured to the casing side by a main shaft bearing in a rotatable fashion.

The gear box 72 is arranged between the main shaft 71 and the coupling 73. The gear box 72 increases the rotational speed inputted from the main shaft 71 from the rotor head 4 side and transmits the increased rotational speed to the coupling 73. The gear box 72 may employ, for example, a combination of a planetary gear type speed increasing mechanism and a spur gear type speed increasing mechanism (neither mechanisms are shown), but is not limited to these mechanisms.

Figure 8:
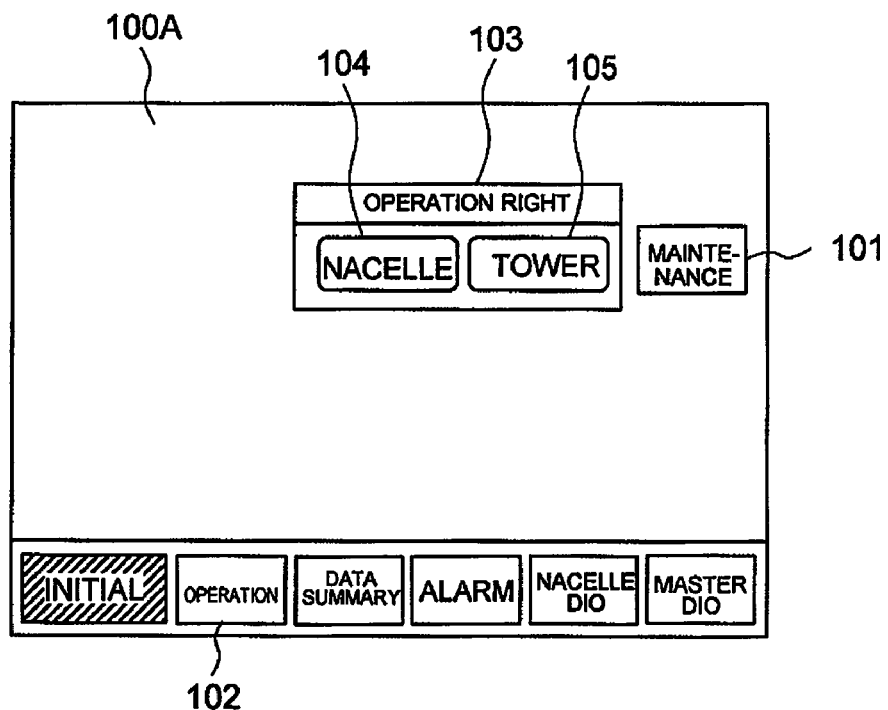
FIG. 8 is a view showing another example of a startup screen of the handy terminal.

The pitch driving system 6 changes the pitch angle of the blades 5 by rotating the blades 5 around an axis (shown in FIG. 8 with dashed lines).

Figure 9:
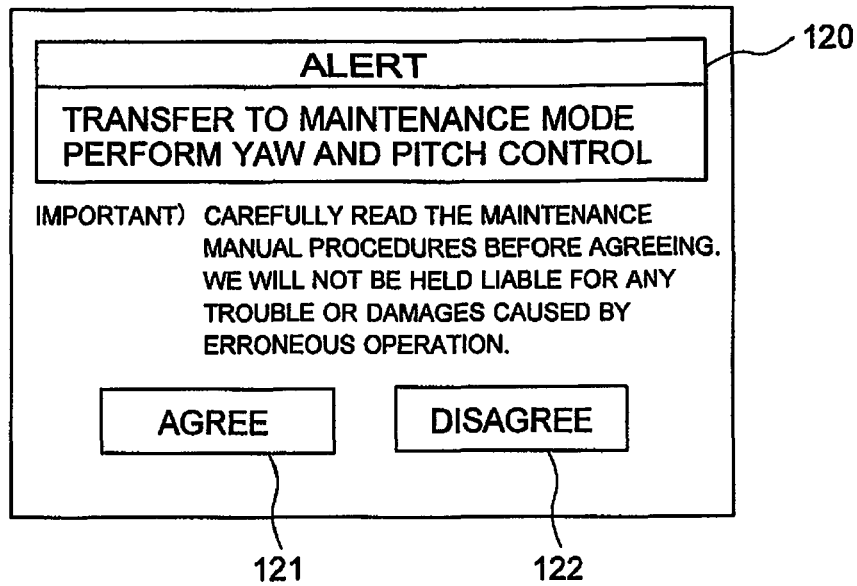
FIG. 9 is a view showing an alert screen that appears when transferring to the maintenance mode from the startup screen.

With such a wind turbine generator 1, the connecting end 11 may be arranged on the tower 2 side and on the nacelle 3 side. In this case, it is preferable that the screen on the display portion 33 to perform the maintenance mode operation is displayed differently by connecting the handy terminal 30 to either the nacelle 3 side or to the tower 2 side. For example, as shown in FIG. 9, when the handy terminal 30 is connected to the nacelle 3 side, an alert message 121 can be displayed on the maintenance mode screen to alert the operator that erroneous operation after transition to the maintenance mode could potentially be dangerous, or an agreement button (not shown) to waive the handy terminal's manufacturer of any responsibility caused by erroneous operations could appear on the screen. This will raise safety consciousness as well as improve work efficiency.

The above described wind turbine generator 1 is selectively equipped with the aircraft warning light 61, the lightning current measuring device 62, the lightning approaching sensor 63, the lightning strike counter 64, the output restricting means, the curtailment control means and the wind speed calibration means, and further includes the control circuits 13 (13A, 13B) that controls these equipments and means.

The control circuit 13 includes the tower side control circuit 13A provided on the tower 2 and the nacelle side control circuit 13B accommodated in the nacelle 3. The control circuits 13A and 13B are electrically connected and can be controlled identically. The control circuit 13 has an interlock function so that when condition setting or setting changes to the control logics in the maintenance mode is preformed on either one of the control circuits 13A and 13B, the other control circuit can not transfer to the maintenance mode.

Next, an embodiment of the present invention will be described, step by step.

FIG. 8 is an example of a startup screen of the handy terminal. FIG. 9 is a view showing an alert screen that appears when transferring to the maintenance mode from the startup screen.

A startup screen 100A displays a plurality of operation buttons including the maintenance mode button 101 and the operating mode button 102 comprising the mode selecting end 34, which perform the mode selection (S3 in FIG. 4). When the operating mode button 102 is pressed, the settings in the handy terminal 30 and the settings in the control circuit 13 transfer to the operating mode (S4 in FIG. 4). On the other hand, when the maintenance mode button 101 is pressed, although the settings in the handy terminal 30 and the settings in the control circuit 13 transfer to the maintenance mode (S5 in FIG. 4), it first transfers to an alert screen 120 as shown in FIG. 9 before transferring to the maintenance mode. The alert screen 120 reminds the maintenance operator of the risks now that the YAW and the pitch can be operated, and at the same time, before transferring to the maintenance screen, makes the operator refer to the maintenance manual procedures so that the manufacturer is not held liable for erroneous operations.

In the alert screen shown in FIG. 9, the operator selects a 'Agree' 121/'Disagree' 122 button to the content shown on the screen. When the 'Agree' 121 button is pressed, the screen transfers to the next operating screen of the maintenance screen, while if the 'Disagree' 122 button is pressed, the screen returns to the startup screen 100A. Further, when the 'Agree' 121 button is pressed, the button selection result is transmitted as track record to the remote control center (the management device 56 in FIG. 1).

Figure 10:
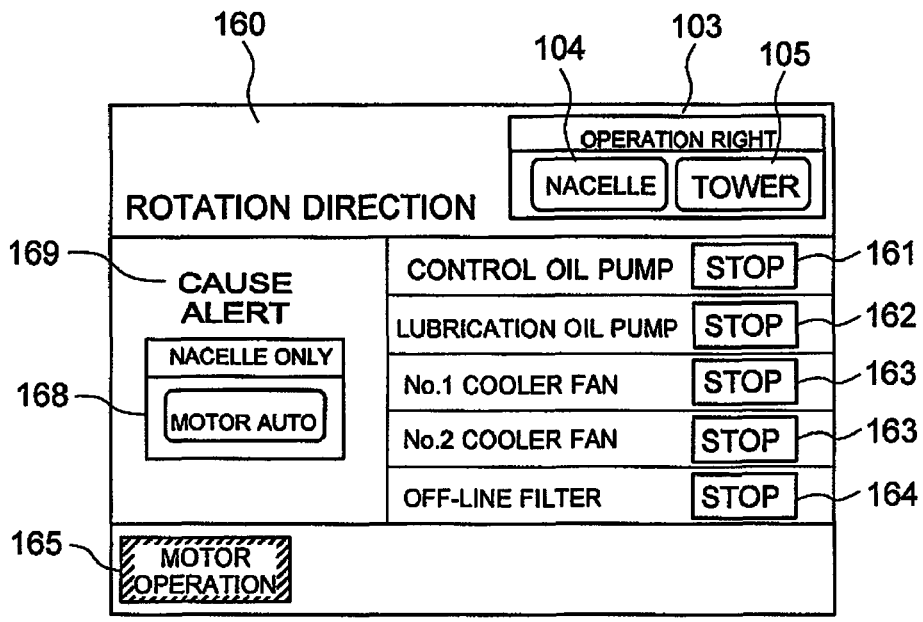
FIG. 10 is a view of a screen where accessory motor individual drive control buttons appear for performing separate manual operations on each individual accessory on driving and stopping each motor corresponding to the accessories in the maintenance mode.

In FIG. 10, after the 'Agree' is pressed in the alert screen 120 in the maintenance mode, in the given example, a next operation screen 160 appears displaying a content field "motor operation" 165 in the lower left column. At the same time, accessory motor individual drive control buttons appear on the screen for performing separate manual operations on each individual accessory on driving and stopping each motor corresponding to the accessories in the maintenance mode.

The screen also displays the following; a start-stop button 161 for a control oil pump motor 136 (refer to FIG. 13) provided in the control oil circuit for yaw control or for blade pitch control contained in the nacelle, a start-stop button 162 for a lubricating oil pump motor 144 (refer to FIG. 14) provided in the lubricating oil circuit of the gear box 72 (refer to FIG. 17), start-stop buttons 163 and 163 for a lubricating oil cooling fan motor 149 (refer to FIG. 14) for cooling the lubricating oil, and a start-stop button 164 for an off-line filter pump motor 148 (refer to FIG. 14) provided in the lubricating oil impurity filtering line 143.

The "alert display" 169 shown in FIG. 10 also appears before the pitch closing operation, the yaw circling operation and the main shaft brake operation in the maintenance mode.

In this screen, provided that the handy terminal 30 is connected to the connecting end 11 on the nacelle side, start-stop of each accessory motor can be performed through the motor operating screen in the maintenance mode (from the nacelle side).

In this case, the operation function of the maintenance mode will not allow other operation functions in the maintenance mode (i.e. only one operation function in the maintenance mode).

Further, after transferring to the operating mode from the maintenance mode, the operation of the maintenance mode is essentially reset, but is maintained within the same mode. Also, the yaw circling operation in the maintenance mode is not reset even if the mode is transferred to the operating mode.

The start-stop buttons 161-164 of the accessory motors are only operable in the nacelle. By operating only in the nacelle, it is possible to timely and visually confirm the rotation direction of the motor.

A motor auto button 168 is provided to allow automatic/manual switching of the start-stop buttons. The maintenance mode is normally "auto" operated. By pressing the motor auto button 168 once, the operation switches to "manual", however at the time of switching, the automatic operation state is maintained.

By pressing the stop portions of each accessory once, the start-stop buttons 161-164 become a non-operative state and "stopped" is displayed. Further, when the stop portions of each accessory are pressed again once by manual operation, the accessories become an operative sate and "operating" is displayed. Simultaneously, the operation is switched to "auto" and the operation transfers to automatic operation from the time of the switching.

However, the manual operation is not allowed when there is an overload on the motor, and the above operation is not allowed during booster adjustment or other operations during other maintenance modes.

Because this motor operating screen appears on the screen, the motor rotation direction can be confirmed without using a maintenance tool, thus work efficiency will improve.

Figure 13:
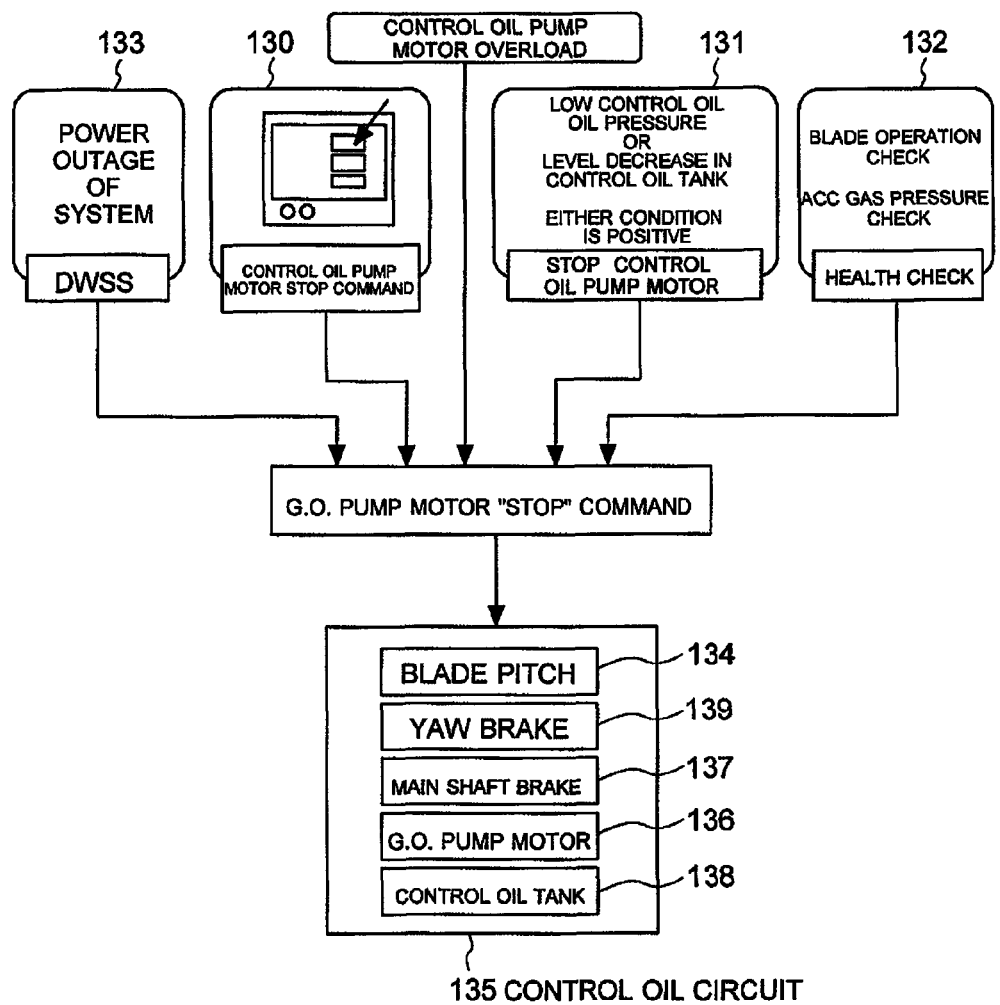
FIG. 13 is a view showing a controlled state of a control oil pump motor provided in the control oil circuit for yaw control or for blade pitch control contained in the nacelle.

FIG. 13 is a view showing a controlled state of the control oil pump motor 136 provided in the control oil circuit for yaw control or for blade pitch control contained in the nacelle. As shown in the figure, the control oil circuit 135 is provided with a control oil pump (G.O. pump) 136, a yaw brake 139 and a main shaft brake 137 on the control oil line circulating from the control oil tank 138 to perform blade pitch control 134 and yaw control. The start-stop control of the control oil pump motor 136 is controlled by a DWSS (power outage of the system) 133 or by pressing the start-stop button 161 of the control oil pump motor 136 through the maintenance screen to thereby manually control the start-stop by sending a control oil pump motor stop command 130. However, if either there is an overload on the control oil pump motor or the control oil pressure is low, or a control oil pump motor stop command is issued due to a decrease in the level 131 of the control oil tank 138 or a health check 132 by a blade movement check by ACC gas pressure check, priority is given to these situations over the start-stop button 161, and the pump motor is "stopped".

Figure 14:
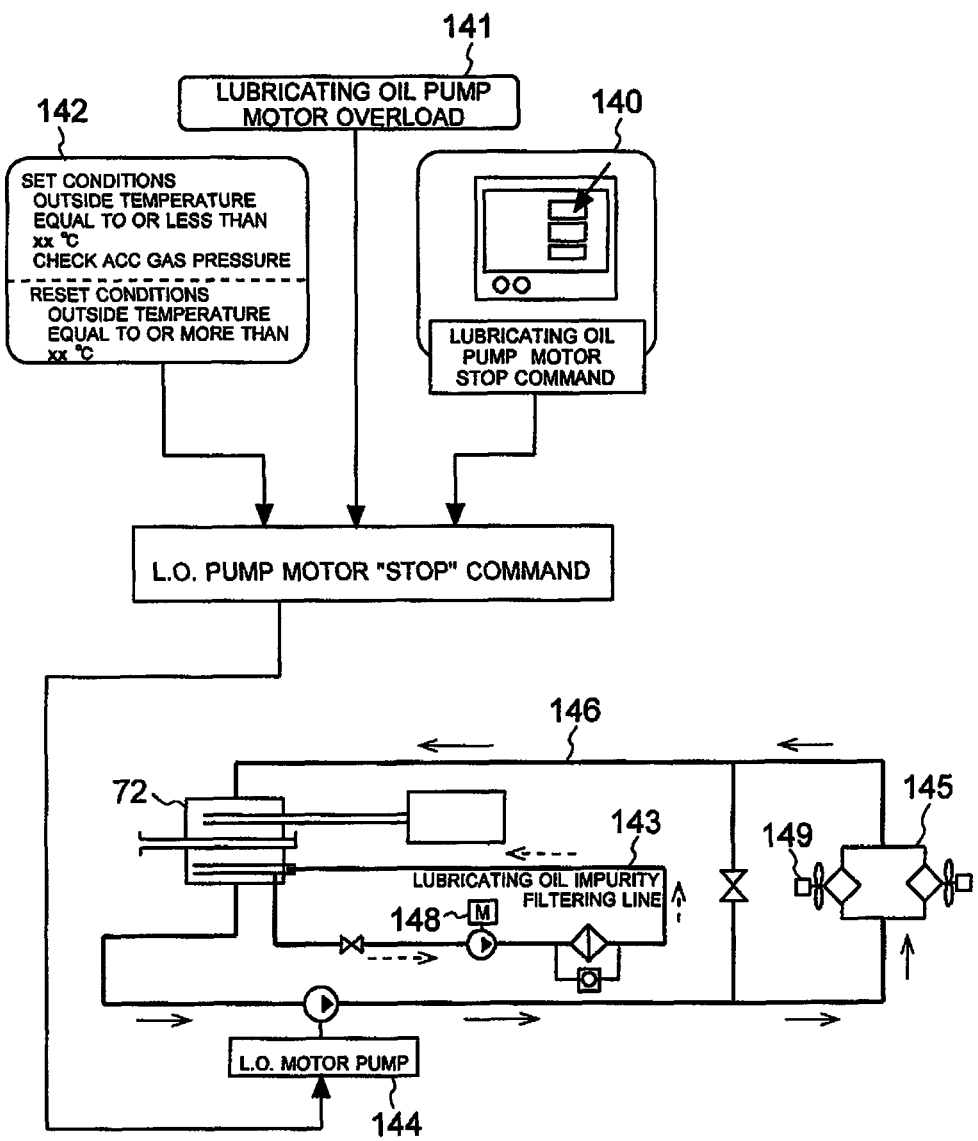
FIG. 14 is a view showing a controlled state of a lubricating oil pump motor provided in the lubricating oil circuit of the gear box contained in the nacelle.

FIG. 14 is a view showing a controlled state of the lubricating oil pump motor 144 provided in the lubricating oil circuit 146 of the gear box 72 contained in the nacelle. The lubricating oil circuit 146 is an oil circuit that circulates lubrication oil between the gear box 72 and the oil cooler 145 by the lubrication oil (L.O.) pump motor 144, and has a lubricating oil impurity filtering line 143.

Similarly, the start-stop control of the lubricating oil circuit 146 is manually controlled 140 by the stop-start button 162 of the lubricating oil pump motor 144. However, the stop-start button 166 gives priority to environmental and accumulator states (outside air temperature is equal to or less than 0° C./outside air temperature is equal to or more than 5° C., ACC gas pressure check) 142, where even if the lubrication oil pump motor stop command 140 can not be issued due to a lubricating oil pump motor overload state 141, the lubrication oil pump motor 144 is stopped.

Figure 15:
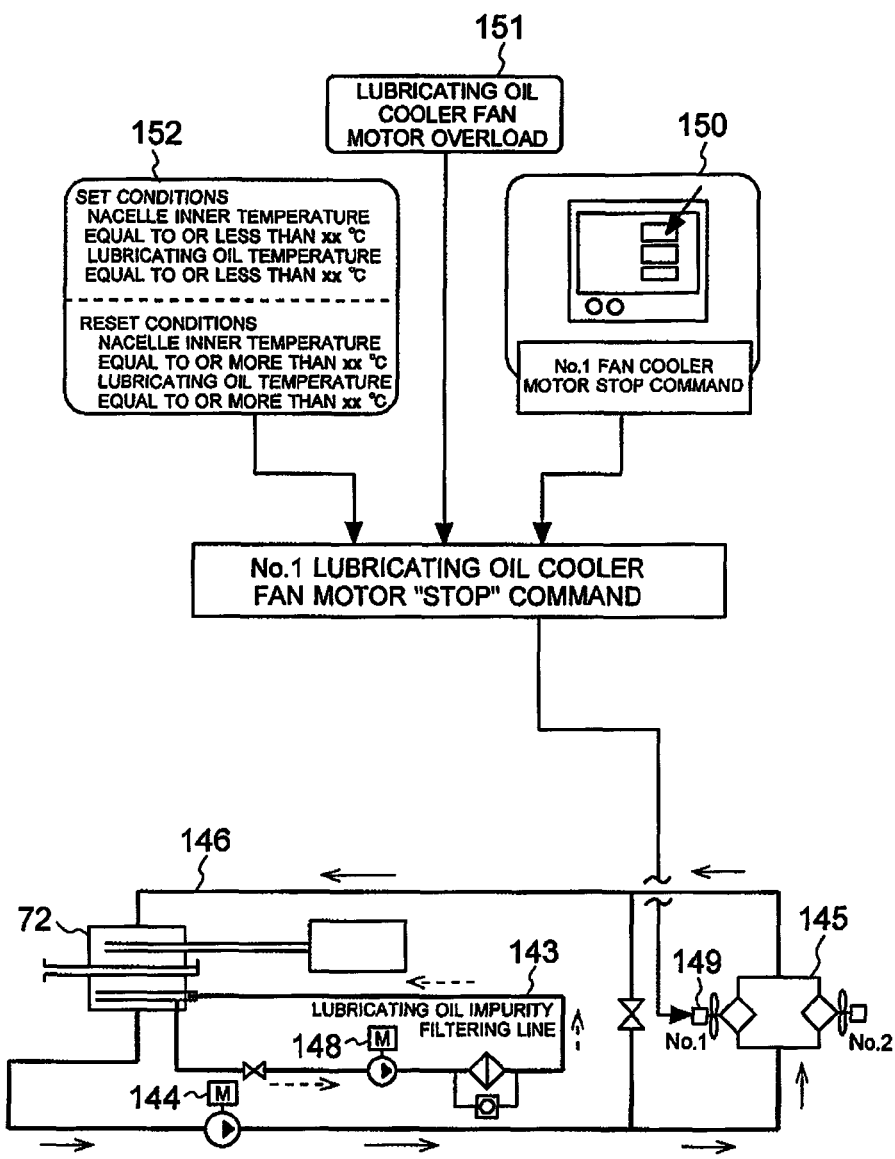
FIG. 15 is a view showing a controlled state of a cooler fan motor for cooling the lubricating oil provided in the lubricating oil circuit of the gear box contained in the nacelle.

FIG. 15 is a view showing a controlled state of a lubricating oil cooler fan motor for cooling the lubrication oil provided in the lubricating oil circuit of the gear box contained in the nacelle.

The structure of the lubricating oil circuit 146 of the gear box is the same as that in FIG. 14, and the start-stop control 150 is also controlled manually by the stop-start button 163 of the lubricating oil cooler fan motor 149. However, according to the inside temperature of the nacelle and the temperature of the lubricating oil (nacelle inside temperature is equal to or less/more than 45° C., lubricating oil temperature is equal to or less/more than 45° C.) state 152, even if the fan motor stop command 150 can not be issued due to a lubricating oil cooler fan motor overload state 151, the fan motor 149 is stopped.

Figure 16:
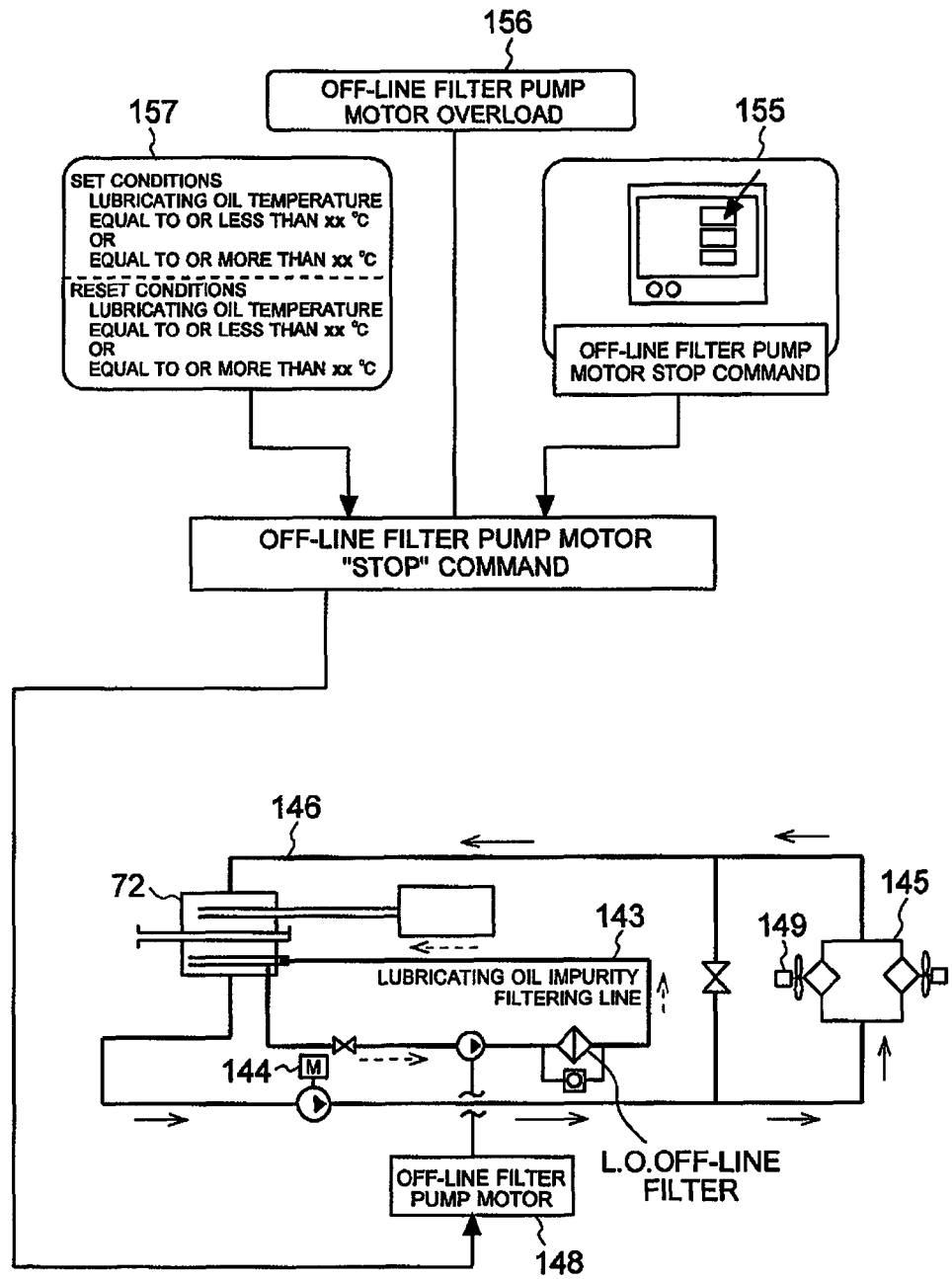
FIG. 16 is a view showing a controlled state of an off-line filter pump motor provided in a lubricating oil impurity filtering line in the lubricating oil circuit of the gear box contained in the nacelle.

FIG. 16 is a view showing a controlled state of an off-line filter pump motor provided in a lubricating oil impurity filtering line in the lubricating oil circuit of the gear box contained in the nacelle. The structure of the lubricating oil circuit 146 of the gear box is the same as that in FIG. 14, and an off-line filter pump motor 148 is provided on the lubricating oil impurity filtering line 143. Again, in the lubricating oil circuit 146, the start-stop control 155 of the off-line filter pump motor 148 is manually performed by the start-stop button 164. However, the button 164 gives priority to the state of the lubricating oil (lubricating oil temperature equal to or less/more than 45° C.) 157, and even if the stop command 155 of the off-line filter pump motor 148 can not be issued due to an off-line filter pump motor over load state 156, the off-line filter pump motor filter pump 148 is stopped.

Figure 11:
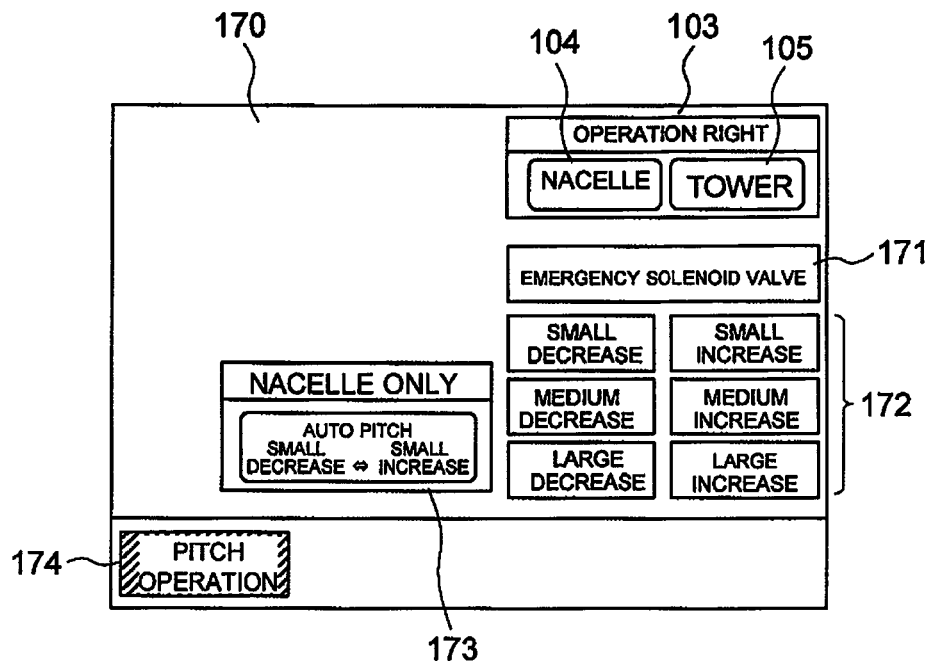
FIG. 11 is a view showing a screen where an "auto" operation button appears that performs "blade pitch control" according to the wind speed in the maintenance mode and an "increase/decrease manual operation button" appears for manually performing increase and decrease of blade pitch angle.

FIG. 11 shows a "pitch operation" screen 170 where an "auto" operation button appears that performs "blade pitch control" according to the wind speed in the maintenance mode and an "increase/decrease manual operation button" appears for manually performing increase and decrease of blade pitch angle. In this screen, a content field "pitch operation" 174 appears in the lower left frame, together with an "auto" button 173 for performing "blade pitch control" in the center and, further to the right, the "increase/decrease manual operation button" 172 appears for manually increasing and decreasing the blade pitch angle. The "increase/decrease manual operation button" 172 includes "small decrease/small increase", "medium decrease/medium increase" and "large decrease/large increase", that can be used according to the degree of increase/decrease.

Further, an ON operation button is provided for an emergency solenoid valve 171 that carries out emergency halt of the pitch control.

According to the present invention, when performing conventional greasing to the main shaft bearing of the blade circling ring, the pitch opening and closing operation can be done automatically by pressing the "auto" operation button 173 of the "blade pitch control" on the handy terminal 30, once at the beginning of the task. This eliminates the necessity to repeat the opening and closing of the pitch in the maintenance mode. If the "auto" operation button 173 is pressed again during the pitch opening and closing operation, the automatic pitch opening and closing is terminated.

However, even if the "auto" operation button 173 is pressed, if the average wind speed is equal to or above 10 m/s, or if the main shaft brake is OFF, or if the emergency solenoid valve is non-excited, the operation become prohibited.

Since the lubrication of the main shaft bearing is performed on the nacelle side, the operation of the "auto" operation button 173 is operable only when the handy terminal 30 is connected to the nacelle. Further, during automatic pitch opening and closing, other performance instructions can not be received. Also, when the automatic pitch opening and closing has been cancelled and the pitch is closing, the next performance instruction is not accepted until the pitch is fully closed.

When pitch control is performed by step-auto of the "increase/decrease manual operation button", even if the automatic pitch opening and closing button is pressed, it will not be accepted. Also, during "pitch control", although it is possible to transfer from the "pitch operation" screen 170 to another screen, other operations are prohibited.

Figure 12:
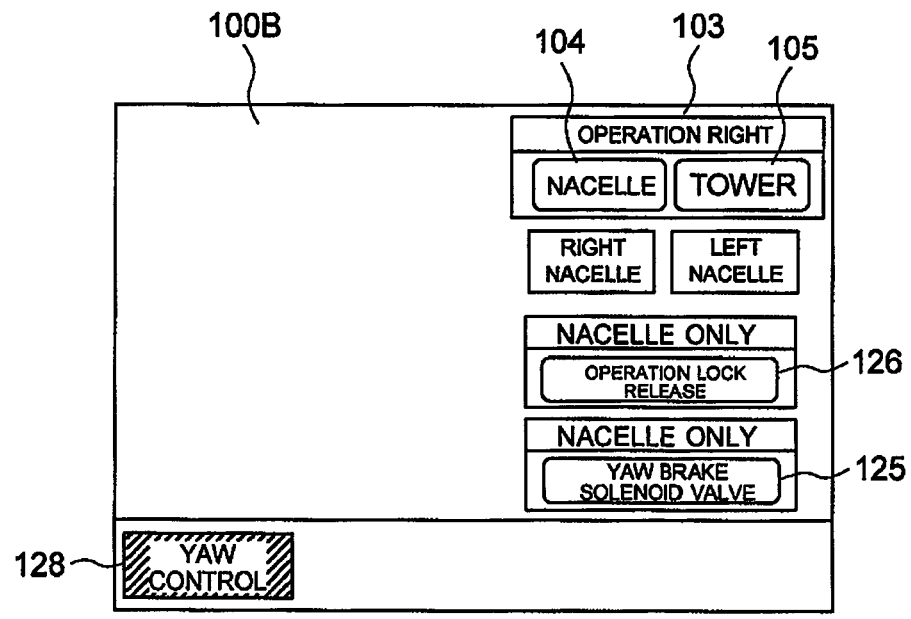
FIG. 12 is a view showing a screen where a yaw brake release/excite button appears on a screen that has transited to yaw control from the startup screen of the maintenance mode.

FIG. 12 is a view showing a screen 100B where a yaw brake release/excite button appears on a screen that has transited to yaw control from the startup screen of the maintenance mode. In this screen, a content field "yaw operation" 128 appears in lower left frame, together with operating buttons for a yaw brake solenoid valve 125 and an operation lock release 126. Pressing the yaw brake solenoid valve button 126 will excite/non-excite the solenoid valve.

In this case also, even if a YAW circling command is issued, if the actual pitch angle is not in a stop position or the wind speed is equal to or more than 15 m/s the operation of these buttons are prohibited.

By this screen, since the YAW is not revolved by pressing the yaw brake solenoid valve button 126, it is not necessary to set YAW breaker OFF, nor worry about the alarm output for booster adjustment by directly operating the ON/OFF of the yaw brake solenoid valve 125.

Especially, since the yaw brake solenoid valve button 125 can directly be turned ON/OFF, it becomes easy to implement YAW booster adjustment.

According to the above, a handy terminal for a wind turbine generator which the maintenance of the wind turbine generator, especially the maintenance work inside the nacelle, can be simplified as well as taking into account the safety of maintenance operators can be realized.

The invention claimed is:

1. A handy terminal for a wind turbine generator comprising a tower adapted to stand on land or off-shore, a nacelle supported on the tower to be controlled to rotate in the yaw direction and a plurality of rotatable blades attached to the nacelle to be controlled to move their pitch, wherein the handy terminal is adapted to connect to connecting ends respectively provided on the lower portion of the tower and the nacelle, and is configured to control the wind turbine generator, the handy terminal comprising:

a connecting portion for connecting the handy terminal to the connecting ends;

an operation button connected to the connecting portion for generating operation signals for various control devices that are incorporated into a control circuit in the wind turbine generator;

a display portion for displaying an operating state of the operation button; and a control portion for performing display control of the operation button, wherein the control portion of the operation button makes a mode selecting button to appear that selectively enables a maintenance mode or an operating mode of the wind turbine generator, and makes an operation button to appear that separately controls at least one of: a blade pitch control, a yaw brake control: and an accessory motor provided on an oil circuit to control the blade pitch control and the yaw brake control that are incorporated in the wind turbine generator, correspondingly to a corresponding maintenance operation screen displayed on the display portion when the maintenance mode is selected from the selecting button, wherein the control portion for performing display control of the operation button makes an operating button that separately controls the blade pitch control, the yaw brake control and the accessory motor control to appear or enable that operating button, when the connecting portion is connected to the connecting end provided on the nacelle.

2. A handy terminal for a wind turbine generator according to claim 1, wherein the display portion is a touch panel, and wherein the control portion for performing display control of the operation button makes a desired operation button to appear on the touch panel so as to make an operating button that can separately control the blade pitch control, the yaw brake control and the accessory motor that are incorporated into the wind turbine generator to selectively appear correspondingly to the corresponding maintenance operation.

3. A handy terminal for a wind turbine generator according to claim 1, wherein the control portion for performing display control of the operation button makes a yaw break release/excite button to appear on a screen that has transited to yaw control from the startup screen of the maintenance mode, under the condition that the connecting portion has been connected to the connecting end provided on the nacelle side.

4. A handy terminal for a wind turbine generator according to claim 1, wherein the control portion for performing display control of the operation button makes accessory motor individual drive control buttons to appear for performing separate manual operations on each individual accessory on driving and stopping each motor corresponding to the accessories in the maintenance mode, when the operation button is the accessory control button.

5. A handy terminal for a wind turbine generator according to claim 1, wherein the control portion for performing display control of the operation button prohibits operation of an operation button that individually controls a blade pitch control and an accessory control even when that operation button is press, if the motor of the blade pitch control or the motor of the accessory control of the pressed operation is in an overload state.

6. A handy terminal for a wind turbine generator according to claim 1, wherein the control portion for performing display control of the operation button makes an "auto" operation button that performs the blade pitch control according to a wind speed in the maintenance mode state and an "increase/decrease manual operation button" that manually performs increase or decrease of the blade pitch angle to appear, when the operation button is the blade pitch control operation button.

7. A handy terminal for a wind turbine generator according to claim 6, wherein the control portion of the operation button does not allow other operation buttons to be operated when either the "auto" or "increase/decrease manual operation button" of the "blade pitch control" is turned ON.

8. A handy terminal for a wind turbine generator according to claim 1, wherein the control portion for performing display control of the operation button makes an alert display to appear to alert that erroneous operation after transition to the maintenance mode could potentially be dangerous, and an agreement button to appear to waive the handy terminal's manufacturer of any responsibility caused by erroneous operations, when the maintenance mode has been selected from the mode selection button, and transfers to the maintenance screen after the agreement button has been pressed.

9. A handy terminal for a wind turbine generator according to claim 8, wherein the alert display is made to appear before operating either a pitch opening operation, a yaw circling operation or a main shaft braking operation in the maintenance mode.

* * * * *